United States Patent [19]

Gibbs

[11] Patent Number: 5,117,970
[45] Date of Patent: Jun. 2, 1992

[54] IDLER ROLLER SLEEVE

[75] Inventor: A. Todd Gibbs, Allentown, Pa.

[73] Assignee: Asgco Manufacturing, Inc., Allentown, Pa.

[21] Appl. No.: 717,546

[22] Filed: Jun. 19, 1991

[51] Int. Cl.$^5$ .............................................. B65G 39/10
[52] U.S. Cl. ..................................... 198/842; 198/808
[58] Field of Search ............... 198/842, 806, 808, 780; 193/37; 29/121.1, 121.5, 121.6, 122

[56] References Cited

U.S. PATENT DOCUMENTS

| | | |
|---|---|---|
| 1,586,477 | 5/1926 | Smothers . |
| 1,771,784 | 7/1930 | Grupe . |
| 2,247,081 | 6/1941 | Fears . |
| 2,437,050 | 3/1948 | Schulz . |
| 3,657,779 | 4/1972 | Granberry . |
| 3,847,260 | 11/1974 | Fowler .......................... 198/842 X |
| 4,402,390 | 9/1983 | Feeny ................................... 193/37 |
| 4,646,677 | 3/1987 | Lounsbury, Jr. et al. ..... 29/121.5 X |
| 4,926,995 | 5/1990 | Kauffman ...................... 198/780 X |

Primary Examiner—D. Glenn Dayoan
Attorney, Agent, or Firm—Dann, Dorfman, Herrell & Skillman

[57] ABSTRACT

A one-piece replacement sleeve is provided for installation on a conveyor belt roller to prolong the roller's wear life. The cylindrical, split sleeve has a central bore to receive the roller and circumferential grooves in the outer surface to receive fastening circlets to fasten the sleeve to the roller. The sleeve has two radial slits oppositely disposed and extending axially along the entire length of the sleeve to facilitate easy installation and replacement of the sleeve. The slits allow the sleeve to be installed on the roller without the need to remove the roller from its journal mountings. The slits also allow the worn sleeve to be quickly and easily removed by cutting or otherwise removing the fastening circlets. Since the sleeve is formed of one piece of material, the sleeve wears concentrically, reducing vibrations in the conveyor belt assembly. The sleeve provides significant improvements over roller discs and two-piece roller sleeves in the prior art.

15 Claims, 3 Drawing Sheets

IDLER ROLLER SLEEVE

FIELD OF THE INVENTION

The present invention relates to replacement sleeves for use on conveyor belt return idler rollers. The invention is especially adapted for use with conveyors which are exposed to harsh operating conditions such as in steel mills, mines and quarries. In particular a one-piece, cylindrical, slotted roller sleeve is provided which can be installed and replaced without removing the roller from its journal mountings.

BACKGROUND OF THE INVENTION

Conveyor belts are supported and driven by a number of different idler rollers and pulleys, respectively. Among the many different idler rollers well known in the prior art are impact idlers, scale idlers, offset center roll troughing idlers, extended center roll troughing idlers, and return idlers. In general, the idler rollers may be either straight, or segmented and tilted so as to trough the conveyor belt and increase its volume capacity. Idler rollers are used both on the upper, load-carrying portion and the lower, return portion of the conveyor.

When ballast or other particulate material is deposited on the load carrying portion of the belt, the conveyor belt is supported from underneath by troughing rollers which trough the belt to increase the belt's volume capacity for particulate material. The troughing rollers come into contact with the clean side or inside of the load carrying portion of the conveyor belt.

After the load is discharged, sediment and debris from the load remain on the return portion of the conveyor belt. The return portion of the belt is supported from underneath by straight return idler rollers which, unlike troughing rollers, come into contact with the dirty side or outside of the return portion of the conveyor belt. The dirt and debris remaining on the outside of the belt after discharge is extremely abrasive and significantly reduces the wear life of the return idler rollers.

To prolong the wear life of the return idler rollers, it is known to provide circular, flat discs fitted on the rollers to increase their life. The circular, flat discs may be made of several different materials such as polyurethane, rubber ceramic or steel, for example, and are formed in various dimensions. The discs are provided with a central bore slightly smaller than the outer roller diameter. The discs are force fitted over the roller and held in place by the resultant frictional force.

While roller discs of this type extended the life of the roller assembly, these discs are very time-consuming to install and replace. To replace worn roller discs of this type, it is necessary to dismantle the roller assembly from its journal mountings. This task is burdensome due to the weight of the rollers and conveyor belt, and costly due to the resultant down-time of the conveyor. Another type of assembly provided in the prior art to extend the life of idler rollers comprises two longitudinally-extending, mating sleeve halves adapted to be clamped on an idler roller. A roller sleeve of this type is disclosed, for example, in U.S. Pat. No. 3,657,779. Roller sleeves of this type are an improvement over replacement roller disks but are still difficult to install and replace in the field, especially when the roller sleeve is in contact with the conveyor belt. In this situation, two or more men are required simultaneously to lift the conveyor belt weighing, for example, 30 lbs/ft, off the roller and to replace the roller sleeve halves.

Another significant problem encountered using roller sleeves of this type is eccentric wear after installation. The material at the boundaries between mating sleeve halves has a tendency to bulge outwardly when the sleeve halves are compressed and clamped together. The sleeve assembly then retains an eccentric or elliptical shape which significantly reduces the sleeve assembly's wear life. The eccentric shape of the sleeve assembly also greatly increases vibrations in the conveyor belt assembly.

Split roller sleeves of this type have, however, a significant advantage over replacement roller discs. Split roller sleeves are easy to remove by simply removing the clamping mechanism and allowing the two sleeve halves to fall off the roller. The two piece design of split roller sleeves similarly makes them easier to install than roller discs by eliminating the need to remove the roller from its journal mountings.

Idler roller sleeves may be made of several materials such as urethane, ceramic, and steel, and have a wear life of approximately two weeks to three months, depending on the environment in which they are used. In the most abrasive environments such as steel mills, even idler roller sleeves made from steel last approximately 2-3 weeks and require two men approximately four hours to replace when worn. It is therefore an object of the present invention to provide a roller sleeve which is easy and quick to install and replace under all conditions without disassembling the roller from its journal mountings.

It is also an object of the present invention to provide a roller sleeve which wears concentrically after installation which extends the wear life of the roller sleeve.

SUMMARY OF THE INVENTION

The present invention provides a one-piece replacement roller sleeve for straight return idler rollers. The sleeve has one radial slit equal in length to the sleeve wall thickness and a second radial slit oppositely disposed from the first slit and shorter in length than the wall thickness. Each slit extends axially along the entire length of the sleeve.

The first slit provides a slotted opening for the sleeve such that the sleeve may be installed on the roller without the need for removing the roller from its journal mountings to expose the roller ends. The second slit effectively creates a hinge connecting the opposed generally semi-cylindrical halves of the sleeve such that the sleeve halves may be opened a distance at least equal to the outer diameter of the roller shaft and installed over the shaft. The sleeve then can be closed and tightly fitted around the roller shaft and clamped thereto. The connecting portion between the sleeve halves maintains the concentricity of the two halves and assures proper mating when the halves are closed. After the connecting portion of the sleeve acting as a hinge is worn away, the one-piece sleeve becomes two sleeve halves clamped together. At this point the sleeve can be unclamped, easily removed, and quickly replaced with a new sleeve.

The present invention significantly reduces the down-time of the conveyor belt and reduces labor cost since only one workman is required to replace the worn sleeves even if the conveyor belt is in contact with the roller. The one-piece design of the present invention also wears concentrically, reduces vibrations, and increases the wear life of the roller sleeves.

DETAILED DESCRIPTION OF THE PREFERRED EMBODIMENT

Figure 1:
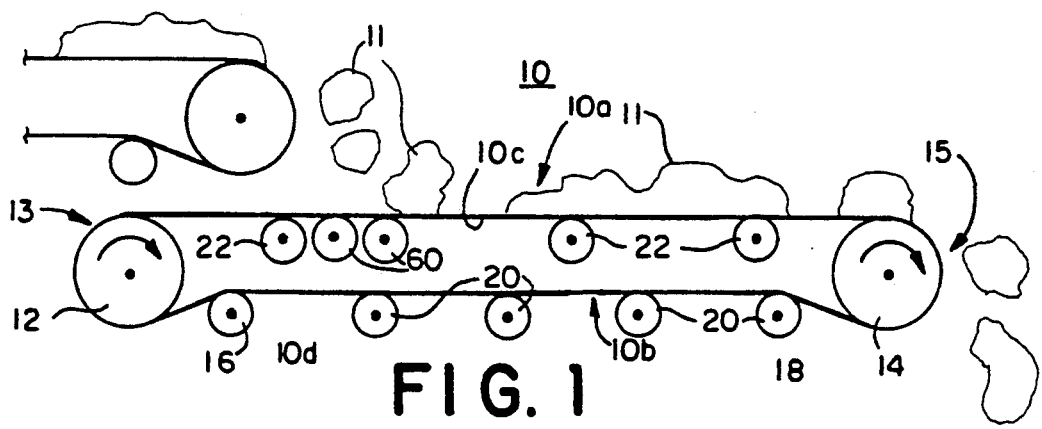
FIG. 1 is a diagrammatic side elevational view of a conveyor belt installation, showing the head end pulleys and the idler rollers.

Referring now in greater detail to the drawings, a conventional belt installation is shown in FIG. 1 comprising a conveyor belt 10, head pulley 14 and tail pulley (12) at the loading end 13 and discharge end 15, respectively, snub pulleys 16 and 18, troughing rollers 22 under the load carrying portion 10a of the belt 10, and return idler rollers 20 under the return portion 10b of the conveyor belt 10. The direction of rotation of pulleys 12 and 14 is shown in FIG. 1 diagrammatically by arrows on the pulleys.

The load carrying portion 10a of the conveyor belt 10 is supported on its clean side or inside 10c by the troughing rollers 22. The return portion 10b of the conveyor belt 10 is supported on its dirty side or outside 10d by the return idler rollers 20. The debris which remains on the belt 10 after the ballast or other particulate material 11 has been discharged at the discharge end 15 comes into contact with and causes severe wear on the return idler rollers 20.

Figure 2:
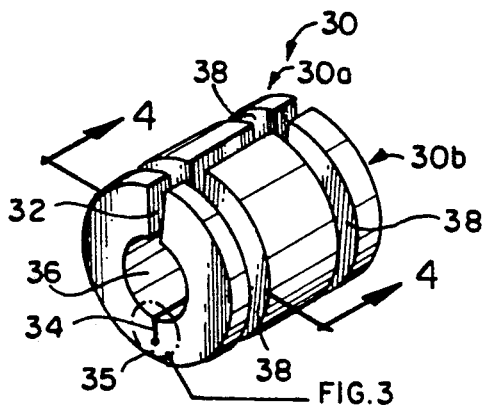
FIG. 2 is a perspective view of a roller sleeve partially opened according to a preferred embodiment of the invention.
Figure 7:
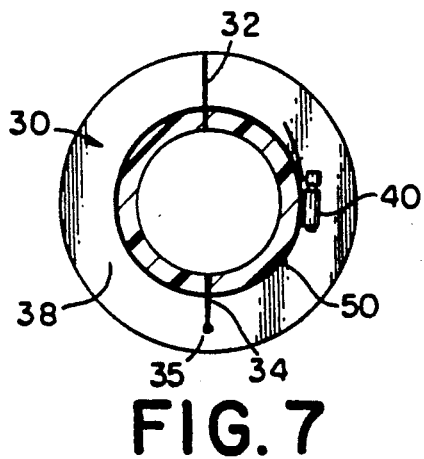
FIG. 7 is a sectional view taken along line 4—4 of FIG. 2 showing a closed sleeve installed and banded on a roller.
Figure 8:
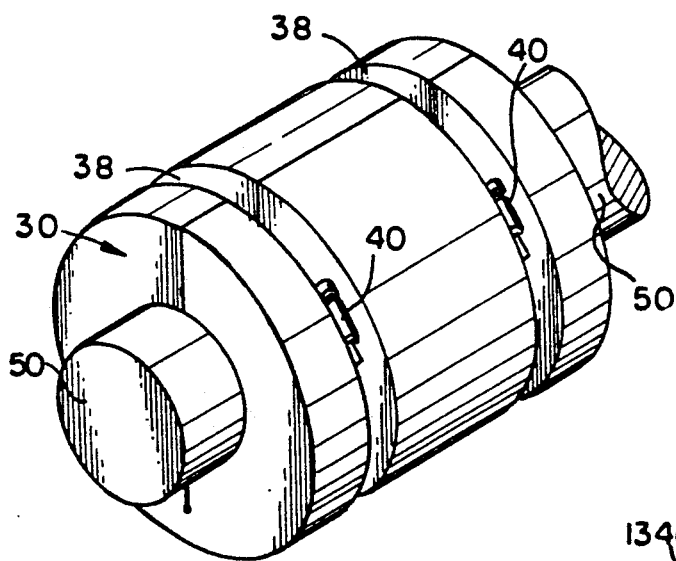
FIG. 8 is a perspective view of a closed sleeve installed and banded on a roller.

A return idler roller sleeve 30 in accordance with a preferred embodiment of the present invention is shown in FIG. 2. A series of roller sleeves 30 is mounted along the length of a straight, cylindrical roller 50. Each roller sleeve 30 is split so that it may be assembled around and laterally on the rollers and securely held together by clamps, as seen in FIGS. 7 and 8, which also prevent longitudinal movement of the sleeve along the roller. The idler roller is journaled at its ends for rotation by anti-friction means such as bearings (not shown). As seen in FIG. 2 et seq., the idler roller shaft need not be removed from its journal mountings or mounting brackets to install or replace the roller sleeve in accordance with the present invention.

The cylindrical split sleeve 30 has two radial slits 32 and 34 and a straight central bore 36, each running along the entire axial length of the sleeve, as shown in FIG. 2. The slits 32 and 34 are aligned diametrically of the cylindrical sleeve to form opposed sleeve halves. Two circumferential grooves 38 are provided for receiving fastening circlets 40 such as hose clamps to secure the sleeve 30 to the roller 50.

Figure 5:
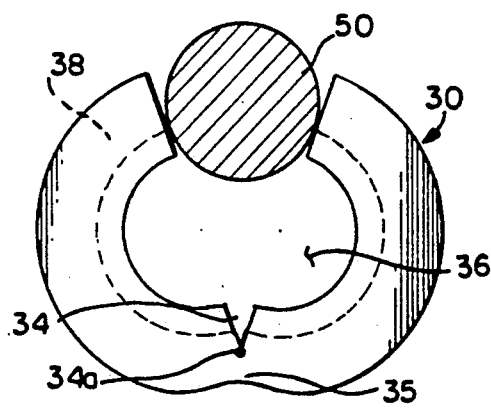
FIG. 5 is an end view of FIG. 2 showing the more-fully opened sleeve for installation on a roller.

The first slit 32 extends radially entirely through the walls of the sleeve. Since the replacement sleeve is not a closed cylinder, the sleeve may be installed on the roller 50 by separating the sleeve halves at the slit 32 and fitting the sleeve halves around the roller 50, as seen in FIG. 5. Thus, it is unnecessary to remove the roller from its journal mountings to slide the sleeve over the roller ends.

The first slit 32 is very narrow, for example, approximately 0.125" in width which allows for a small degree of dimensional variance in the roller shaft. For example, a sleeve designed for 3.25" outer diameter rollers would preferably have a 3.125" inner sleeve diameter and a 0.125" slot. In the preferred embodiment, the slot is not completely closed upon tightening of the fastening circlets 40 if the roller shaft is truly 3.25". If, however, the shaft is slightly undersized, the sleeve may still be tightly fastened to the shaft as seen in FIGS. 7 and 8, but the first slit 32 approaches a completely closed configuration. Conversely, a small degree of oversizing in the roller shaft would widen slightly the first slit 32 after installation.

The radial length of the first slit 32 is equal to the thickness of the sleeve, for example, 3" to 4". The radial length of the second slit 34 depends on the hardness of the sleeve material. To facilitate easy separation of the sleeve at the first slit 32 during installation, sleeves made of a harder, less flexible material require a longer second slit than sleeves made of a softer material. In a preferred embodiment of the invention, the sleeves are made of an 82 Durometer Shore A elastomeric material which provides long wear in abrasive environments and sufficient resiliency and flexibility during installation such that the sleeve returns to its preformed shape without permanent deformation after installation. 60 to 95 Durometer Shore A elastomeric materials are also acceptable with corresponding second slit lengths ranging from, for example, 1.25" to 1.75", respectively, on a sleeve with a 3.375" wall thickness.

As seen in FIG. 2, the second slit 34 partially divides the replacement sleeve into two semi-cylindrical sections 30a and 30b. The second slit 34 is located preferably 180 degrees opposite the first slit 32 so that the sections 30a and 30b comprise sleeve halves. Each section 30a and 30b is effectively hinged about the slit and connected to each other by the sleeve wall connecting section 35 located radially beyond the outer end of the second slit 34. The sections 30a and 30b can rotate about the slit 34 independent of and relative to each other. As set forth below, this design contrasts and improves on the sleeve assembly of U.S. Pat. No. 3,657,779 which defines two semi-cylindrical sleeve halves which are not integrally connected as in the present invention.

Figure 4:
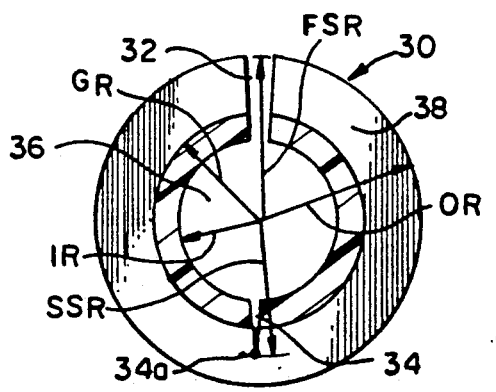
FIG. 4 is a sectional view taken along line 4—4 of FIG. 2 showing the sleeve partially opened.

The sleeve has an inner radius, IR, and outer radius, OR, defined by the distance from the central axis of the sleeve to the inner surface and outer surface of the sleeve walls, respectively. The two lateral, circumferential grooves 38 have equal groove radii, GR, less than the outer radius, OR, and greater than the inner radius, IR, as seen in FIG. 4.

The first slit 32 originates at the inner surface of the sleeve and terminates at the outer surface of the sleeve. Thus, the first slit end radius, FSR, is equal to the outer radius, OR. The second slit 34 originates at the inner surface of the sleeve and terminates at a point within the walls of the sleeve. The second slit end radius, SSR, has a length less than the outer radius, OR, but greater than the inner radius, IR, and greater than the groove radius, GR. To summarize, the relationship among the sleeve radii upon installation is as follows: $OR = FSR > SSR > GR > IR$. As described hereinafter, the outer radius and first slit end radius decrease, absolutely and relative to the other defined radii, as the roller sleeve wears down.

Figure 3:
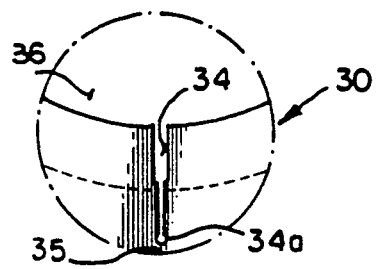
FIG. 3 is an enlarged fragmentary view of the portion of FIG. 2 encircled at 3, showing the partial slit and connecting portion of the roller sleeve.
Figure 6:
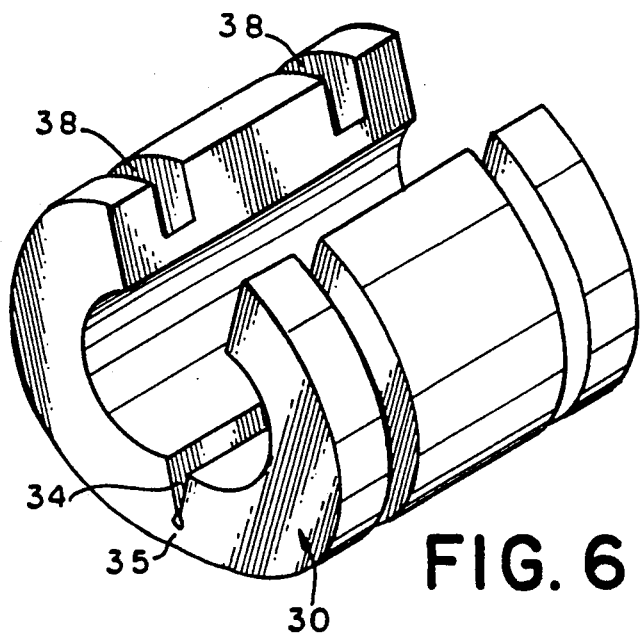
FIG. 6 is a perspective view of a more-fully opened sleeve for installation on a roller.

To install a roller sleeve in accordance with the present invention, the sleeve halves are separated at the slit 32 at least as wide as the outer diameter of the roller 50 as seen in FIGS. 5 and 6. As mentioned above, the second slit 34 allows the sleeve to be opened easily to fit over the idler roller 50. The second slit 34 is formed with a rounded terminus at its end 34a as seen in FIG. 3 to prevent the slit from migrating further into the sleeve wall as the sleeve halves are separated. Fastening circlets 40 such as stainless steel hose clamps are next placed in the lateral grooves 38 and tightened to securely hold the sleeve together on the shaft 50 as seen in FIGS. 7 and 8. The frictional force developed between the roller 50 and the inner surface of the sleeve prevents the sleeve from moving longitudinally along the roller.

After installation of the sleeve, the outer diameter and first slit end diameter of the sleeve begin to decrease as the outside surface of the sleeve wears away. Eventually the sleeve connecting wall section 35 located radially beyond the radius of the end of the second slit 34, wears down into the second slit end diameter. The sleeve wall section 35, having been completely worn away, no longer connects the semi-cylindrical sections. The sleeve sections are now physically separated and are held together only by the fastening circlets 40 in the circumferential grooves 38.

The point where the sleeves become physically separated defines the wear life of the sleeve. It is preferred that the second slit radius not only be at least as great as the groove radius but also as great as the radial distance from the central axis to the farthest point on the fastening circlets 40. In this manner, the wear life of the sleeve is reached before the conveyor belt comes into contact with and begins to wear on the fastening circlets 40 themselves. The sleeve halves may then be removed by cutting or unclamping the fastening circlets 40. The sleeve halves 30a and 30b conveniently fall off of, or are knocked from, the roller. Thus, there is no need to remove the roller from its journal mountings during installation or removal of the replacement sleeves 30.

Preferably the sleeves are formed as short segments which are positioned in endwise confronting relation along the length of the roller 50, either endwise abutting to form a continuous support, or in endwise spaced relation to provide a disc-like support. The axial length of the segments is selected to facilitate their mounting by a single worker.

The present invention uniquely combines the beneficial qualities of a one-piece circular, flat replacement disc and a two-piece replacement sleeve. During its wear life, a sleeve according to the present invention, is a one-piece unit. As such, the sleeve does not present the problem of eccentric wear. Since the sleeve is molded from one piece of material, the sleeve wears uniformly and concentrically. This increases the wear life of the sleeve and also greatly reduces vibrations created by the rollers. When the sleeve's wear life has been reached, the sleeve separates into two pieces which can be easily removed simply by cutting or unfastening the fastening circlets 40 without the need to remove the roller 50 from its journal mountings. The first slit 32 in the replacement sleeve also allows the sleeve to be installed initially without the need to remove the roller form its journal mountings. The sleeves are provided in standard widths and may be combined in a sequence on a single roller to accommodate conveyor belts of various widths.

Figure 9:
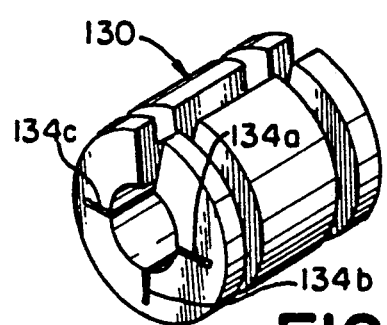
FIG. 9 is a perspective view of a first alternative embodiment of the present invention showing several radial slits in the sleeve.

In another embodiment of the present invention, the replacement sleeve 130 has more than one second slit 134 or supplemental slits as seen in FIG. 9. In this embodiment, the supplemental slits 134a, 134b, and 134c cooperate to perform the same functions as the second slit 34 in the first preferred embodiment. A sleeve according to this embodiment could have special application, for example, to an impact roller 60 as seen in FIG. 1. At the point where ballast 11 or other heavy particulate material is loaded on the belt 10, re-enforcing rollers i.e. impact rollers, are provided to help absorb the high impact load of falling ballast. The supplemental slits 134a, 134b, and 134c in this embodiment help the roller sleeve 130 to absorb impact energy of the falling ballast 11 without becoming deformed.

Figure 10:
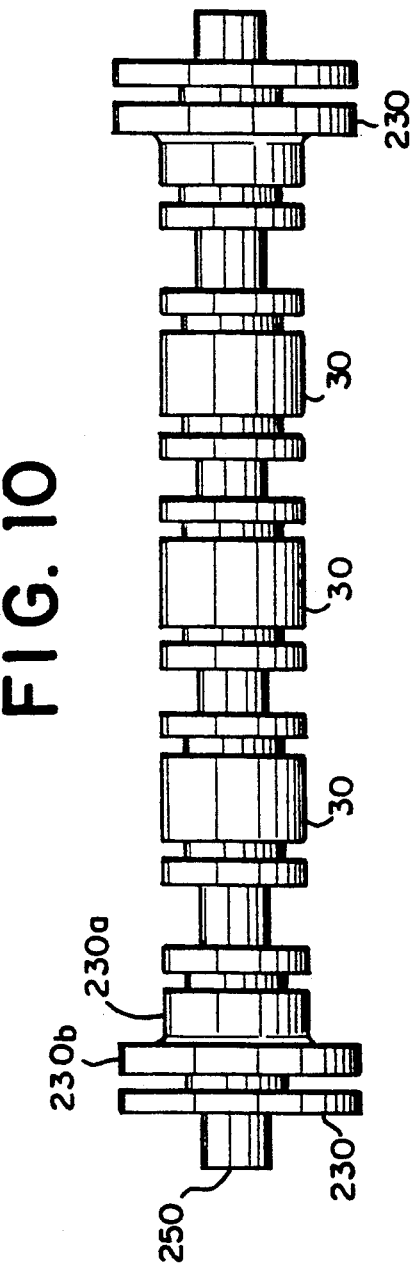
FIGS. 10 and 11 are side elevational views of additional embodiments of the present invention showing an assembly of sleeves with belt-guiding end walls, and with a longitudinally tapered diameter for troughing a conveyor belt.

In another alternative embodiment of the present invention shown in FIG. 10, a stepped sleeve 230 is provided for guiding a conveyor belt. A roller sleeve 230 according to this embodiment would preferably be the first and last sleeves in a sequence of roller sleeves according to the first embodiment of the present invention to prevent the belt from drifting off the straight roller sleeves.

In this embodiment the sleeve 230 comprises two sections discretely defined by two different outer surfaces 230a and 230b, each surface having different outer surface radii and first slit radii. The radius of each outer surface is stepped, having a first constant value from one end of the sleeve to a medial point on the sleeve. The radius of the outer surface has a second constant value less than the first constant value from the medial point to the other end of the sleeve.

The conveyor belt travels over and is supported by the first outer surface 230a of the sleeve defined by the smaller outer sleeve surface radius. The second outer surface of the sleeve 230b guides and prevents lateral movement of the conveyor belt from the normal path of travel. The second outer surface of the sleeve is defined by the larger outer sleeve surface radius.

The circumferential groove radii, second slit end radius, and inner radius are constant along the length of the sleeve. This embodiment is installed and replaced in essentially the same manner as the aforementioned embodiments. Since the outer edges of the conveyor belt do not cause as much wear on the underlying sleeve segments as the central part, replacement of the sleeves 230 is required only infrequently.

Figure 11:
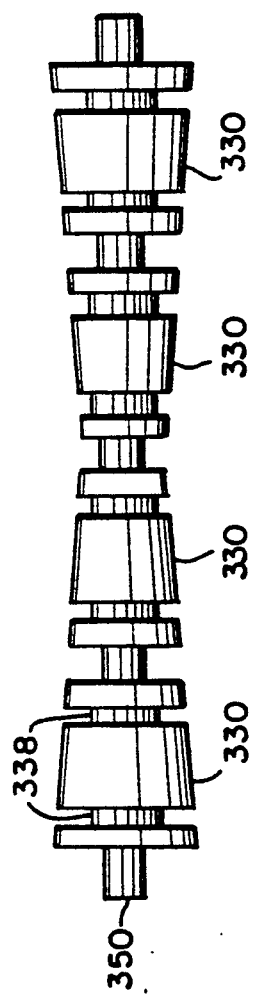

In another embodiment of the present invention as shown in FIG. 11, the outer radius, first slit end radius and second slit end radius of the roller sleeve 330 are proportionally tapered and diverge outwardly from the center of a roller along the length of the sleeve as seen in FIG. 11. The inner radius and groove radius remain constant along the length of the sleeve. While the relationships between these three diverging sleeve radii remain unchanged relative to each other, each is tapered along the length of the sleeve to provide the additional function of troughing the belt using a single straight roller shaft 350. In this manner, several segmented and tilted roller shafts with sleeves of uniform cross-sections can be replaced with one straight roller shaft with several endwise abutting or endwise spaced tapered roller sleeves 330 for troughing the load carrying portion of the belt.

An assembly of tapered roller sleeves according to this embodiment of the present invention is shown in FIG. 11 and could also be used on the return portion of the conveyor belt to trough the return portion of the belt to prevent the belt from drifting to either side of the conveyor. The sleeves in the assembly have decreasing outer sleeve surface radii from one end of the roller to an intermediate point on the roller. The sleeves have increasing outer sleeve surface radii from the intermediate point to the other end of the roller.

As shown in FIG. 11, when assembled in a spaced sequence, the sleeves 330 according to this embodiment have a straight uniform central bore and inner radius adapted to receive a single straight roller 350. The outer radii of the sleeves diverge along the length of the sleeve. The inner and outer radii define the thicknesses of the sleeve walls which also diverge along the length of the sleeve to form a troughed surface for intermittently supporting and troughing the conveyor belt. A series of sleeves according to this embodiment may also be arranged in an abutting sequence along the roller shaft to trough and continuously support the belt.

In this embodiment, the circumferential grooves 338 disposed laterally on the sleeve have uniform groove radii to accommodate fasteners of the same size throughout the series of sleeves and perform the same function as the grooves in the two aforementioned embodiments. The first slit has a diverging length equal to the thickness of the sleeve. The second slit also has a diverging length less than the first slit and a diverging second slit end radius.

While particular embodiments of the present invention have been herein illustrated and described, it is not intended to limit the invention to such disclosures but changes and modifications may be made therein and thereto within the scope of the following claims.

I claim:

1. A cylindrical, split sleeve for installation on a roller having an outer roller surface, said sleeve having:
    a central axis and a straight, central bore adapted to receive said roller;
    an inner surface on said sleeve within said bore;
    an outer surface on said sleeve, the space between said inner and outer surfaces defining the wall thickness of said sleeve;
    a circumferential groove in the outer surface of said sleeve for receiving a fastening circlet for fastening and preventing longitudinal movement of said sleeve on said roller, said groove having a circumferential bottom;
    a first slit equal in length to said wall thickness and disposed generally radially and extending axially between said inner and outer surfaces along the entire length of the sleeve; and
    a second slit originating at said inner surface and terminating at a point within said sleeve wall, said second slit being disposed generally radially and extending axially along the entire length of the sleeve and having a termination point within said sleeve wall to provide a connecting portion within said wall beyond said second slit,
    said first and second slits dividing said sleeve into two parts connected by said connecting portion, said connecting portion being formed of flexible material to afford separation of said parts along said first slit a distance to afford radial passage of the roller through said first slit during installation.

2. A sleeve according to claim 1 wherein said second slit termination point has an end radius measured from said central axis greater than the radius of said groove bottom and less than the radius of said outer sleeve surface.

3. A sleeve according to claim 1 wherein said inner sleeve surface and said outer sleeve surface are coaxial with said central axis when said sleeve is fastened to said roller.

4. A sleeve according to claim 1 wherein the radius of said outer sleeve surface diverges along the length of said sleeve.

5. A sleeve according to claim 4 wherein the radius of said termination point of said second slit diverges proportionally along the length of said sleeve relative to the radius of said outer sleeve surface, wherein the radial distance from said second slit termination point to said outer sleeve surface is constant along the length of said sleeve.

6. A sleeve according to claim 1 wherein the radius of said outer sleeve surface is stepped, said radius having a first constant value from one end of said sleeve to a medial point on said sleeve, said radius having a second constant value less than said first constant value from said medial point to the other end of said sleeve.

7. A sleeve according to claim 1 wherein said sleeve is composed of elastomeric material, said material providing sufficient resiliency to prevent permanent deformation of said sleeve after separating said sleeve parts during installation.

8. A sleeve according to claim 1 wherein the radius of said inner sleeve surface is not greater than the radius of the outer roller surface.

9. A sleeve according to claim 1 wherein said second slit is disposed 180 degrees opposite said first slit whereby said sleeve parts constitute sleeve halves.

10. A sleeve according to claim 1 comprising several supplemental radial slits located equidistantly and circumferentially on said sleeve for absorbing impact loading energy.

11. A sleeve according to claim 1 wherein said second slit termination point is rounded to prevent migration of said slit when said sleeve parts are separated and installed on said roller.

12. A conveyor belt assembly exposed to harsh operating conditions including an endless conveyor belt operable to carry a load on one run and having a return run and cylindrical, split sleeves for installation on at least one of said rollers to lengthen the wear life of said rollers, said sleeves having:
    a central axis and a straight, central bore adapted to receive said roller;
    an inner surface on said sleeve within said bore;
    an outer surface on said sleeve, the space between said inner and outer surfaces defining the wall thickness of said sleeve;
    a circumferential groove in the outer surface of said sleeve for receiving a fastening circlet for fastening and preventing longitudinal movement of said sleeve on said roller, said groove having a circumferential bottom;

a first slit equal in length to said wall thickness and disposed generally radially and extending axially between said inner and outer surfaces along the entire length of the sleeve; and a second slit originating at said inner surface and terminating at a point within said sleeve wall, said second slit being disposed generally radially and extending axially along the entire length of the sleeve and having a termination point within said sleeve wall to provide a connecting portion within said wall beyond said second slit, said first and second slits dividing said sleeve into two parts connected by said connecting portion, said connecting portion being formed of flexible material to afford separation of said parts along said first slit a distance to afford radial passage of the roller through said first slit during installation, said sleeves being arranged on said roller in a spaced sequence to intermittently support the conveyor belt.

13. A conveyor belt assembly according to claim 12 wherein the first and last sleeves in said sequence comprise stepped sleeves for guiding a conveyor belt, said stepped sleeves having outer sleeve surfaces with outer surface radii, said outer surface radius having a first constant value from one end of said stepped sleeve to a medial point on said stepped sleeve, said outer surface radius having a second constant value less than said first constant value from said medial point to the other end of said stepped sleeve.

14. A conveyor belt assembly according to claim 12 wherein said sleeves have diverging outer surfaces defined by diverging outer surface radii for troughing a conveyor belt, said sleeves in said sequence having decreasing outer surface radii from one end of said roller to an intermediate point on said roller, said sleeves having increasing outer surface radii from said intermediate point to the other end of said roller.

15. A conveyor belt assembly according to claim 14 wherein said sleeves are arranged in an abutting sequence on said roller for continuously supporting and troughing the conveyor belt.

* * * * *